US012613802B2

(12) United States Patent
Kim et al.

(10) Patent No.: US 12,613,802 B2
(45) Date of Patent: Apr. 28, 2026

(54) DEVICE AND METHOD WITH MEMORY REQUEST PROCESSING USING MEMORY ADDRESS SPACE EXTENSION

(71) Applicant: SAMSUNG ELECTRONICS CO., LTD., Suwon-si (KR)

(72) Inventors: Hyunsoo Kim, Suwon-si (KR); Yuhwan Ro, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/350,074

(22) Filed: Jul. 11, 2023

(65) Prior Publication Data

US 2024/0070068 A1     Feb. 29, 2024

(30) Foreign Application Priority Data

Aug. 26, 2022     (KR) ........................ 10-2022-0107826
Apr. 3, 2023      (KR) ........................ 10-2023-0043495

(51) Int. Cl.
*G06F 12/02*          (2006.01)
(52) U.S. Cl.
CPC .. *G06F 12/0292* (2013.01); *G06F 2212/1016* (2013.01)
(58) Field of Classification Search
CPC .................... G06F 12/0292; G06F 2212/1016
See application file for complete search history.

(56) References Cited

U.S. PATENT DOCUMENTS

| | | | |
|---|---|---|---|
| 6,402,795 B1 | 6/2002 | Chu et al. | |
| 6,485,622 B1 | 11/2002 | Fu | |
| 7,901,658 B2 | 3/2011 | Weppner et al. | |
| 8,828,580 B2 | 9/2014 | Visco et al. | |

(Continued)

FOREIGN PATENT DOCUMENTS

| | | |
|---|---|---|
| KR | 10-2017-0027125 A | 3/2017 |
| KR | 10-2017-0045098 A | 4/2017 |

(Continued)

OTHER PUBLICATIONS

Lee, Sukhan, et al. "Hardware architecture and software stack for PIM based on commercial DRAM technology: Industrial product." *2021 ACM/IEEE 48th Annual International Symposium on Computer Architecture (ISCA).* IEEE, 2021.

(Continued)

*Primary Examiner* — Mark A Giardino, Jr.
(74) *Attorney, Agent, or Firm* — NSIP Law

(57) ABSTRACT

Disclosed are a device and method with memory request processing using an extension of a memory address space. An electronic device includes a host processor configured to generate a memory request and a memory address that is mapped to a target memory mode that is any one of available memory modes and is mapped to a physical memory address to which the memory request is to be applied, a memory controller configured to generate the physical memory address and a command according to the target memory mode mapped to the memory address based on the memory request and the memory address received from the host processor, and a memory configured to execute, at the physical memory address, the command received from the memory controller.

19 Claims, 8 Drawing Sheets

(56)            References Cited

U.S. PATENT DOCUMENTS

| | | |
|---|---|---|
| 2018/0006326 A1 | 1/2018 | O'Neill et al. |
| 2020/0293319 A1* | 9/2020 | Lee et al. |
| 2020/0294558 A1* | 9/2020 | Yu ......................... G11C 5/063 |
| 2021/0208801 A1 | 7/2021 | Song |
| 2022/0036929 A1 | 2/2022 | Yu et al. |
| 2022/0068366 A1 | 3/2022 | Kwon et al. |
| 2022/0188023 A1* | 6/2022 | Balasubramanian ........................ G06F 3/0658 |
| 2022/0188233 A1* | 6/2022 | Kalamatianos ..... G06F 12/0828 |
| 2022/0253247 A1 | 8/2022 | Kim et al. |
| 2022/0253248 A1 | 8/2022 | Yoon et al. |
| 2023/0418745 A1* | 12/2023 | Patel ................... G06F 12/0897 |

FOREIGN PATENT DOCUMENTS

| | | |
|---|---|---|
| KR | 10-1867219 B1 | 6/2018 |
| KR | 10-2020-0108772 A | 9/2020 |
| KR | 10-2020-0108773 A | 9/2020 |
| KR | 10-2022-0031793 A | 3/2022 |
| KR | 10-2022-0114449 A | 8/2022 |
| WO | WO 2019/135319 A1 | 7/2019 |

OTHER PUBLICATIONS

Extended European search report issued on Jan. 17, 2024, in counterpart European Patent Application No. 23192404.4 (9 pages).
Korean Office Action issued on Jul. 18, 2024, in counterpart Korean Patent Application No. 10-2023-0043495 (4 pages in English, 7 pages in Korean).

* cited by examiner

400

| | 420 | | | | 410 | | | | | | |
|---|---|---|---|---|---|---|---|---|---|---|---|
| Extended physical address area | | | | | Normal physical address area | | | | | | |
| 63 | 62 | ⋯ | 36 | 35 | 34 | 33 | 32 | ⋯ | 2 | 1 | 0 |

| | 520 | | | | 510 | | | | | | | |
|---|---|---|---|---|---|---|---|---|---|---|---|---|
| Extended virtual address area | | | | Normal virtual address area | | | | | | | | |
| 63 | ⋯ | 48 | 47 | 46 | 45 | 44 | 43 | ⋯ | 3 | 2 | 1 | 0 |

FIG. 5

DEVICE AND METHOD WITH MEMORY REQUEST PROCESSING USING MEMORY ADDRESS SPACE EXTENSION

CROSS-REFERENCE TO RELATED APPLICATIONS

This application claims the benefit under 35 USC § 119(a) of Korean Patent Application No. 10-2022-0107826, filed on Aug. 26, 2022, and Korean Patent Application No. 10-2023-0043495, filed on Apr. 3, 2023, both in the Korean Intellectual Property Office, the entire disclosures of which are incorporated herein by reference for all purposes.

BACKGROUND

1. Field

The following description relates to a device and method with memory request processing using an extension of a memory address space.

2. Description of Related Art

A typical semiconductor memory device is separate from a processor that is configured to perform an operation. A system implementing applications, such as a neural network, big data, Internet of Things (IoT), and the like, may process an operation on a large amount of data and when doing so may experience a bottleneck since a large amount of data is transmitted and received between a semiconductor memory device and a processor in the system. In order to address such a problem, there have been efforts in processing in memory (PIM) semiconductor memory devices in which a memory function is combined with a function of a processor that performs an operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a host processor configured to generate a memory request and a memory address that is mapped to a target memory mode that is any one of available memory modes and is mapped to a physical memory address to which the memory request is to be applied, a memory controller configured to generate the physical memory address and a command according to the target memory mode mapped to the memory address based on the memory request and the memory address received from the host processor, and a memory configured to execute, at the physical memory address, the command received from the memory controller.

One of the memory modes may be a normal memory and another of the memory modes may be a processing in memory (PIM).

The host processor may be configured to generate a different memory address according to a memory mode of the command executed by the memory request at the physical memory address.

The host processor may be further configured to generate an extended physical memory address mapped to the target memory mode and to the physical memory address, in response to the target memory mode indicating processing in memory (PIM).

The host processor may be configured to express the extended physical memory address, using unused bits included in a physical address with respect to the memory.

The memory address may be determined based on a correspondence of the target memory mode to either a physical address space corresponding to the memory or extended physical address spaces of a number of modes of memory requests applicable to a memory mode indicating processing in memory (PIM) among memory modes.

The physical address space may be mapped to a memory mode that operates as normal memory, and the extended physical address space may be mapped to a memory mode that operates as the PIM.

The host processor may be configured to transmit the memory request and the memory address to the memory controller such that the memory request cannot be implemented with access to a cache, in response to the target memory mode indicating processing in memory (PIM).

The host processor may be configured to determine the memory address to be the same as the physical memory address, in response to the target memory mode indicating normal memory among the memory modes.

The host processor may be configured to check whether data is in a cache according to a request of an application and, when the data is not in the cache, transmit the memory request and the memory address to the memory controller, in response to the target memory mode indicating normal memory.

The host processor may be configured to check whether a processing in memory (PIM) operation result is in a cache according to a request of an application and, when the PIM operation result is not in the cache, transmit the memory request and the memory address to the memory controller, in response to the target memory mode indicating normal memory and the PIM operation result stored at the physical memory address.

The memory may be configured to perform either a normal memory operation or a processing in memory (PIM) operation at the physical memory address, according to the command.

In one general aspect, a method of operating an electronic device includes generating, by a host processor included in the electronic device, a memory request and a corresponding memory address mapped to a target memory mode among memory modes included in the electronic device and to a physical memory address to which the memory request is to be applied, generating, by a memory controller included in the electronic device, the physical memory address and a command according to the target memory mode, based on the memory request received from the host processor and the memory address, and executing, by a memory included in the electronic device, the command received from the memory controller at the physical memory address.

Each of memory modes may indicate any one of normal memory or processing in memory (PIM).

The generating of the memory request and the memory address may include generating a different memory address according to a memory mode of the command executed by the memory request at the physical memory address.

The generating of the memory request and the memory address may include generating an extended physical memory address using bits reserved for extended physical memory addresses in response to the target memory mode indicating processing in memory (PIM).

In one general aspect, a method is performed by a computing device, the computing device includes memory including a processing-in-memory (PIM) memory and a non-PIM memory, the method includes receiving memory access requests to access respective addresses of the memory, each address including respective bits, wherein a first portion of bits of each address may be reserved for PIM requests for accessing the PIM memory, and wherein a second portion of bits of each address may be used as a memory address for the access requests, for each memory access request, determining whether to access the corresponding address in the PIM memory or in the non-PIM memory based on the first portion of bits of the corresponding address.

The PIM memory may be configured to perform a multiply-and-accumulate (MAC) operation on data stored in the PIM memory, and wherein some of the memory access requests invoke the MAC operation.

The method may further include, for each memory access request, determining whether the memory access request may be a PIM memory access request, for the memory access requests determined to be PIM memory access requests, setting the first portion of bits of the corresponding addresses to indicate that the addresses may be for PIM memory access requests.

A same address may be used by different memory access requests to access the PIM memory and to access the non-PIM memory, wherein memory caching may be inhibited for accesses to the PIM memory and wherein memory caching may be not inhibited for accesses to the non-PIM memory.

In one general aspect, an electronic device includes a memory including a data storage space and an internal processor for performing a logical operation and/or an arithmetic operation, a host processor configured to generate a first memory address indicating a request for any one of a Processing In Memory (PIM) operation and a normal memory operation, wherein the PIM operation uses the internal processor and the data storage space in the memory while the normal memory operation also uses the data storage space but not the internal processor, a memory controller configured to generate a command and a second memory address of the data storage space to be accessed by the command and transmit the generated command and second memory address to the memory, wherein which of the PIM operation or the normal memory operation in the memory the command executes depends on the first memory address received from the host processor. The first memory address may indicate any one of the PIM operation and the normal memory operation by using one or more bits other than bits necessary to represent the second memory address of the data storage space.

The first memory address may indicate the PIM operation when the one or more bits are used and may indicate the normal memory operation when the one or more bits are not used.

The host processor may be configured to transmit the first memory address to the memory controller without accessing a cache, in response to the first memory address indicating a request for the PIM operation.

The first memory address may be the same as the second memory address when the first memory address indicates a request for the normal memory operation.

Other features and aspects will be apparent from the following detailed description, the drawings, and the claims.

BRIEF DESCRIPTION OF THE DRAWINGS

FIG. 4 illustrates an example of a physical memory address, according to one or more embodiments.

FIG. 5 illustrates an example of a virtual memory address, according to one or more embodiments.

Figure 1:
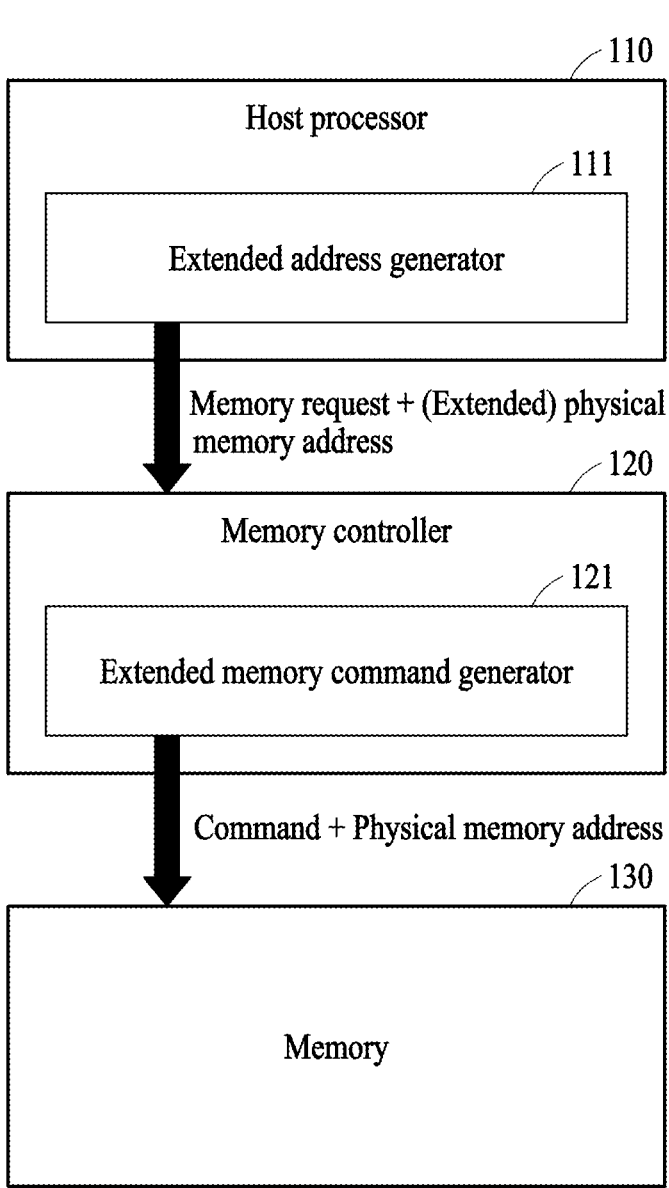
FIG. 1 illustrates an example of an electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples are described in detail with reference to the accompanying drawings. When describing the examples with reference to the accompanying drawings, like reference numerals refer to like constituent elements and a repeated description related thereto are omitted.

FIG. 1 illustrates an example of an electronic device, according to one or more embodiments.

Referring to FIG. 1, an electronic device 100 may include a host processor 110, a memory controller 120, and a memory 130. The electronic device 100 may further include an accelerator such as a graphics processing unit (GPU), for example. The electronic device 100 may be, or may include, for example, any of various computing devices, such as a mobile phone, a smartphone, a tablet personal computer (PC), an e-book device, a laptop, a PC, a desktop computer, a workstation, and a server, various wearable devices, such as a smart watch, smart eyeglasses, a head mounted display (HMD), or smart clothes, various home appliances, such as a smart speaker, a smart television (TV), and a smart refrigerator, and other devices, such as a smart vehicle, a smart kiosk, an Internet of Things (IoT) device, a walking assist device (WAD), a drone, a robot, or the like.

The host processor 110 may control the overall operation of the electronic device 100 and may include various processors, for example, a central processing unit (CPU), a graphics processing unit (GPU), a neural processing unit (NPU), or a tensor processing unit (TPU), a digital signal processor (DSP), and/or the like. The host processor 110 may generate a request for resources or components (e.g., the memory 130) in the electronic device 100 through a host program. For example, the host processor 110 may execute an operating system kernel with memory management functions (e.g., a memory management unit (MMU)) for handling memory requests.

The request generated by the host processor 110 for the memory 130 may be related to a normal memory operation or a processing in memory (PIM) operation. In the case where the generated request is a normal memory operation, the request may be a normal operation of the memory 130 (e.g., read, write, copy, erase, and the like) and may be referred to as a non-PIM operation. In the case where the generated request is a PIM operation, the PIM operation may include, in the memory 130, at least one of a PIM operation (e.g., addition, multiplication, and multiply-and-accumulate (MAC)) and a logical operation (e.g., AND, OR, XOR, and the like). A PIM operation may not necessarily directly identify the requested PIM operation as such (e.g., in the form of a PIM-specific or PIM-identifying instruction). Operations for the PIM operation may not require the host processor 110 and/or the accelerator to read a large amount of operand data from the memory 130, rather, the memory 130 may directly perform an operation for the PIM operation and then the host processor 110 and/or the accelerator may read only a corresponding operation result, thus minimizing use of memory bandwidth and reducing power consumption and the distance of data movement. An operation performed by the memory 130 may vary depending on whether a request generated by the host processor 100 corresponds to a normal memory operation or a PIM operation. The memory 130 may operate in a memory mode corresponding to any one of normal memory and PIM according to a request generated by the host processor 110. For example, when the memory mode corresponds to normal memory, the memory 130 may perform a normal memory operation, such as read, write, copy, erase, and the like. Conversely, when the memory mode corresponds to PIM, the memory 130 may perform a PIM operation, such as a logical operation, an arithmetic operation, and the like.

The accelerator may perform an operation under control of the host processor 110. Considering the characteristics of the operation (e.g., an operation for executing a neural network, an operation on a large number of operands, and the like), for some operations, an accelerator with a dedicated processor may process tasks of the operation more efficiently than if tasks of the operation are processed by the host processor 110 (which may be a main/general processor). For example, the accelerator may include a GPU, NPU, TPU, DSP, and/or the like.

The host processor 110 may generate a memory address together with a memory request. The memory address generated by the host processor 110 may be mapped to a memory address at which an operation according to the memory request is actually to be performed. The generated memory address may be used to indicate whether the memory request is for a normal (or non-PIM) memory operation or a PIM operation. For example, the host processor 110 may generate a memory address with a format (for example) indicating a normal memory operation and may generate a memory address with a format (for example) indicating a PIM operation. Since both the memory address formatted to indicate a normal memory operation and the memory address formatted to indicate a PIM operation are mapped to the same memory address, at which an operation according to the request is actually to be performed by the host processor (e.g., by a memory management unit), the normal memory operation and the PIM operation may be selectively performed with respect to the same memory address of the originally received memory request; either may be selected for the same memory address.

Herein, a memory address requesting a normal memory operation may be referred to as a physical memory address and a memory address requesting a PIM operation may be referred to as an extended physical memory address. The physical memory address may indicate an area of an actual memory in which an operation according to the request is actually performed. The extended memory address may indicate that a request for a PIM operation is made with respect to a memory area corresponding to the physical memory address by additionally including a bit value in the physical memory address. The physical memory address may be a memory address included with an initial memory request received by the host processor 110. A mapping relationship between the physical memory address and the extended physical memory address is described with reference to FIG. 2.

According to an example, an extended address generator 111 included (or executed) in the host processor 110 may be a hardware component or a module of processor-executable instructions that generates (and, e.g., formats) the extended physical memory address that requests the PIM operation. The extended physical memory address may be referred to as an extended memory address since the extended memory address includes bit values indicating a physical memory address and includes additional bit values in unused bits that are not otherwise utilized for the physical memory address. A description of the extended physical memory address in detail follows with reference to FIGS. 4 and 5.

That is, the host processor 110 may generate a memory request and a memory address thereof, based on a memory request (including an original address) received from or generated by an application (e.g., passed into the kernel/OS, MMU, or the like), for example. The generated memory address may be a physical address that is mapped to both (i) a target memory mode, which is any one of available mappable memory modes, and is mapped to (ii) the physical address to which the physical memory request is applied. Each of the memory modes may be an operating mode of the memory 130 indicating either normal memory or PIM.

For example, when a request for a PIM operation to the memory 130 is initiated, the host processor 110 may generate a memory request and an extended physical memory address and transmit the generated memory request and extended physical memory address to the memory controller 120. Alternatively, when a request for a normal memory operation to the memory 130 is initiated, the host processor 110 may generate a memory request and a physical memory address and transmit the generated memory request and physical memory address to the memory controller 120. A memory address generated when a request for a PIM operation is made may be different from a memory address generated when a request for a normal memory operation is made, while memory requests generated by the requests may be the same in both cases. That is, an operation to be performed by the memory 130 may be determined based on a memory address generated by the host processor 110.

In other words, the generated memory address may be generated/formatted by the extended address generator 111 to indicate both a mode of memory to which its memory request applies (e.g., using unused bits, discussed below) and, at the same time may still identify the physical memory address. For example, the generated memory address may include the physical memory address plus additional bits indicating the mode of memory to which the original/generated memory request applies.

The memory controller 120 may manage the flow of data input to, and output from, the memory 130 (which includes various modes, e.g., main memory and PIM memory). The memory controller 120 may generate a command according to the memory request and the memory address received from a host processor 110 and transmit the command to the memory 130. The generated command may use the memory address (e.g., an extended memory address) received from the host processor 110.

The memory controller 120 may generate a command and a corresponding physical memory address according to a target memory mode and may do so based on the memory request and the memory address received from the host processor 110. The generated command may relate to an operation to be executed at the generated physical memory address in the memory 130. The generated physical memory address may indicate a memory area in which the command is executed in the memory 130.

The memory controller 120 may determine whether the memory request is related to a normal memory operation or a PIM memory operation, based on the memory address received from the host processor 110 (the address may have been extended by the extended address generator 111), and may generate a command according to the operation. According to an example, a command to be transmitted to the memory 130 may be generated by an extended memory command generator 121 of the memory controller 120, however, implementations are not limited thereto. For example, when the memory request is related to a normal memory operation, the memory controller 120 may generate, in the memory 130, a normal memory command that commands a normal memory operation and may transmit the generated command to the memory 130. When the memory request is related to a PIM operation, the memory controller 120 may generate, in the memory 130, a PIM command that commands a PIM operation and may transmit the generated PIM command to the memory 130.

Regarding the terminology of memory requests and memory commands, a memory request is expressed at a programmer level and memory commands express a series of operations necessary to actually execute the request in a device. For example, the series of operations may include activating a memory space for loading data, loading the data into the activated space, and inactivating the activated space upon completion of the data processing. A request may map to commands corresponding to the request in advance. For example, such mapping complies with Joint Electron Device Engineering Council (JEDEC) standards.

The memory 130 may store data and also perform PIM operations through an internal processor (or processing circuitry integrated in the memory (in the same chip) but not necessarily as a distinct processor unit therein) and may include, for example, dynamic random-access memory (DRAM), high bandwidth memory (HBM), graphics double data rate (GDDR), low-power double data rate (LPDDR), or the like; examples of the memory 130 are not limited thereto. The memory 130 may be a hardware device capable of performing not only a normal memory operation (e.g., reading and writing data) but also a PIM operation. For example, the memory 130 may be programmable (or configured) to perform various operations. The memory 130 may include a data storage space for storing data and an internal processor (or internal processing circuitry) for performing the aforementioned logical and/or arithmetic operations. A PIM operation may be an operation using the data storage space and the internal processor while a normal memory operation may be an operation using the data storage space but not the internal processor. The memory 130 may execute a command received from the memory controller 120 at the physical memory address of the command. As noted, the memory 130 may perform a normal memory operation or any of various PIM operations and may perform either at the same physical memory address of the command. Since the memory 130 may perform the normal memory operation or the PIM operation according to the command received from the memory controller 120, all or some of the memory 130 may not be designated as the normal memory or the PIM. A cacheable access or a non-cacheable access to all or some of the memory 130 may be available. For example, a non-cacheable access may be performed on one part of the memory 130 while a cacheable access is performed on another part of the memory 130. Cacheable access and non-cacheable access are described with reference to FIG. 2.

The host processor 110 may generate an extended physical memory address by using otherwise-unused bits that are not utilized at the physical memory address, so that various PIM commands may be distinguished from non-PIM commands (i.e., normal memory commands), without requiring the addition of a new instruction set architecture (ISA) or the extension of an existing ISA (the extended address portion may function as a form of "mini opcode"). The host processor 110 may thus dynamically control the PIM commands and the non-PIM commands (i.e., which are to be invoked) with respect to the same physical memory address.

Figure 2:
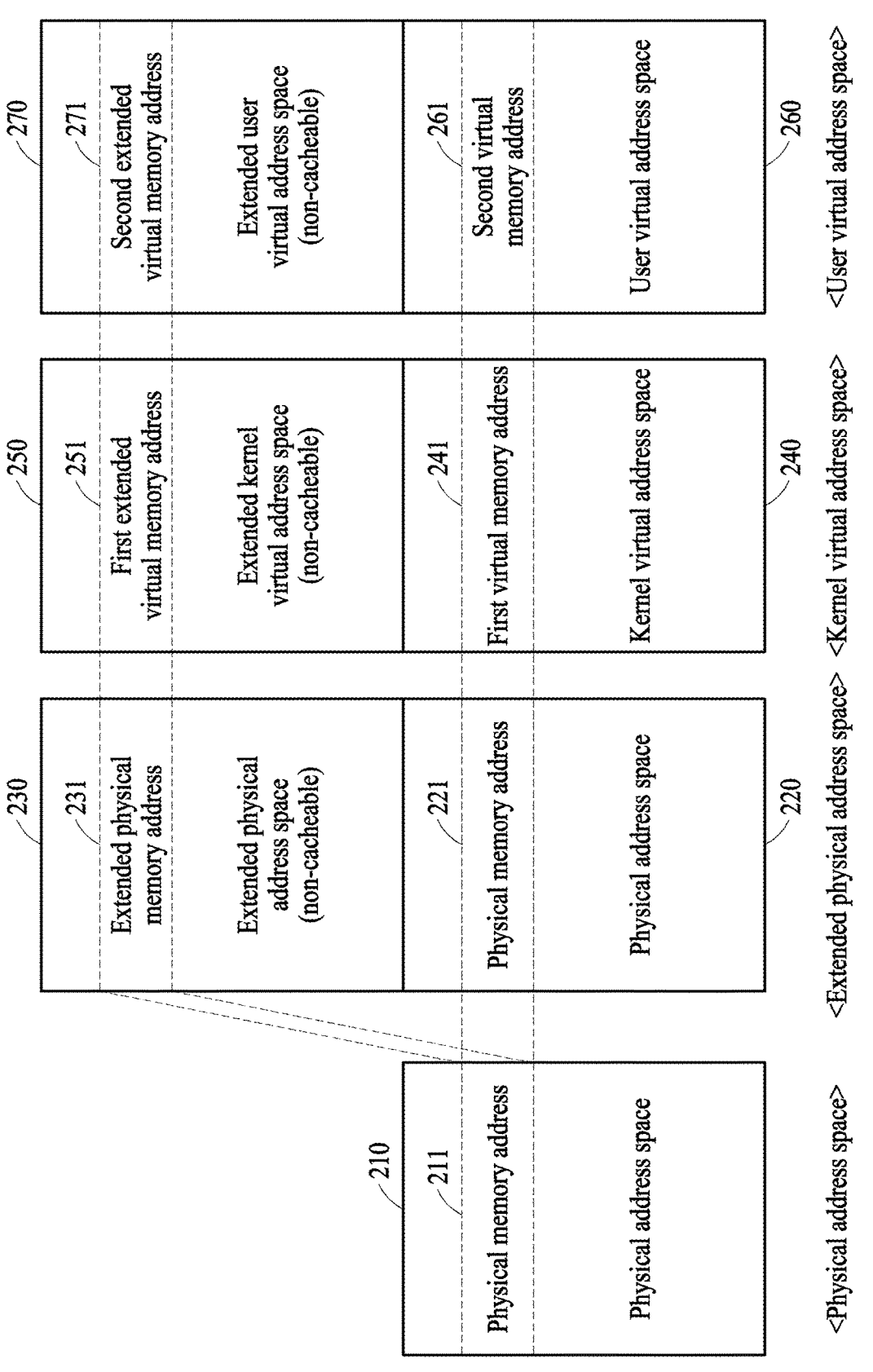
FIG. 2 illustrates an example of a memory address mapping relationship, according to one or more embodiments.

FIG. 2 illustrates an example of a memory address mapping relationship, according to one or more embodiments.

FIG. 2 illustrates, from left to right, a physical address space, an expanded physical address space, a kernel virtual address space, and a user (non-privileged) virtual address space.

FIG. 2 shows a memory address mapping relationship that may be used to identify which one of a normal memory operation and a PIM operation is requested through memory addresses generated by a host processor. The memory address mapping relationship is shown to identify which one of a normal memory operation and a PIM operation is requested for convenience of explanation, however, examples are not limited thereto. In the memory address mapping relationship (for distinguishing normal memory operations from n number of PIM operations), extended physical address spaces 230, extended kernel virtual address spaces 250, and extended user virtual address spaces 270 may, respectively, be as many as n in number (here, n may be a natural number).

A physical address space 210 may indicate a memory in which a memory command is actually executed. A physical memory address 211 may indicate a part or area of the physical address space 210 to which a memory request is to be applied.

An expanded physical address space may be a physical address space to allow a physical memory address to identify which one of a normal memory operation and a PIM operation is requested. The expanded physical address space includes a physical address space 220 and the extended physical address space 230, each mapped to the physical address space 210. The physical address space 220 may indicate a request for a normal (e.g., non-PIM) memory operation and may be the same as the physical address space 210 described above. A physical memory address 221 in the physical address space 220 may indicate a request for a normal memory operation (as opposed to a PIM operation) performed at the physical memory address 211 (in some embodiments, content of an extended address portion may be used to indicate a normal memory operation, e.g., an extended address portion of all zeroes). For example, the physical memory address 221 may have the same bit value as the physical memory address 211. The extended physical address space 230 may indicate a request for a PIM operation, and an extended physical memory address 231 in the extended physical address space 230 may indicate a request for a PIM operation (as opposed to a normal memory operation) performed with respect to the physical memory address 211. For example, the extended physical memory address 231 may indicate that an associated request is a request for a PIM operation to be performed at the physical memory address 211 by including the same bit value as the physical memory address 221 and including additional bit values in unused bits that are not utilized at the physical memory address 221. In some embodiments, different values in the extended portion of an extended memory address may be used to represent different respective PIM operations and/or different PIM memories.

A request for a PIM operation expressed with (or indicated by) the extended physical memory address 231 may be a request for executing an operation in memory (e.g., a PIM operation) and the PIM request may have a non-cacheable characteristic, since the requested command needs to be transferred to the memory (in particular a PIM memory portion thereof) to be carried out. That is, ordinarily, a PIM request cannot be transferred to cache memory, which may not be capable of executing the PIM request. On the other hand, a memory request expressed as the physical memory address 221 may be capable of having either a cacheable or non-cacheable characteristic, according to the request, for example, of a host program.

The cacheable characteristic may be a characteristic of a memory request for which cache access is available (or possible), i.e., it may be a characteristic of a memory request for which memory caching is allowed. The cacheable characteristic may correspond to an operation of checking whether data requested from the host program, for example, is in a cache (e.g., one with relatively low access overhead) and, where the data is not in the cache, then finding the data in another cache (e.g., one with relatively high access overhead) or in main memory. When the requested data is cached, the data may be read quickly from the cache without reading the data from memory, which may contribute to performance improvement. Thus, it may be beneficial to continue to allow cache-based memory requests when possible, even in the presence of PIM-based memory requests. On the other hand, the non-cacheable characteristic may be a characteristic of a memory request (e.g., a read request) for which cache access is not available (or possible) and may correspond to reading data requested by the host program from the memory without checking the cache, for example. Since a PIM operation may normally be performed only when a PIM command is transmitted to the memory, requests for PIM operations may have the non-cacheable characteristic. In addition, a request for a normal operation may potentially, without limitation, have either the cacheable characteristic or the non-cacheable characteristic, according to the request of the host program.

The kernel virtual address space may be an area (address space) managed by an operating system (OS) running in an electronic device and may have an extended kernel virtual address space 250 and a kernel virtual address space 240, each mapped by the OS (e.g., by an MMU) to the physical address space 210. The kernel virtual address space 240 may indicate a request for a normal operation. A first virtual memory address 241 in the kernel virtual address space 240 may indicate a request for a normal memory operation to be performed at the physical memory address 211 (here, "first" only indicates any address in kernel virtual address space). Since a physical address space and a kernel virtual address space have different address systems, the first virtual memory address 241 may have a different bit value from that of the physical memory address 211. The extended kernel virtual address space 250 may indicate that an associated memory requests is a request for a PIM operation. A first extended virtual memory address 251 in the extended kernel virtual address space 250 may indicate that an associated memory request is a request for a PIM operation to be performed at the physical memory address 211. The first extended virtual memory address 251 may indicate that an associated memory request is a request for a PIM operation to be performed at the physical memory address 211 by including the same bit value as the first virtual memory address 241 and including additional bit values in unused bits (bits not utilized at the first virtual memory address 241). A request for a PIM operation expressed as a first extended virtual memory address 251 may be for executing an operation in the memory and may have a non-cacheable characteristic since a corresponding command is to be transferred to the memory and not to a cache (here, "first" only indicates any address in kernel virtual address space). However, a request for a normal memory operation expressed as a virtual memory address 241 can potentially have a cacheable characteristic or a non-cacheable characteristic, according to a request of a host program.

The user virtual address space may be an area (address space) managed by each process running in an electronic device and may have a user virtual address space 260 and the extended user virtual address space 270, each mapped by the OS to the physical address space 210. The user virtual address space 260 may indicate that an associated request is a request for a normal operation. A second virtual memory address 261 in the user virtual address space may indicate that the associated memory request is a request for a normal (non-PIM) operation to be performed at the physical memory address 211 (here, "second" only indicates any address in user virtual address space). Since a kernel virtual address space and a user virtual address space have different address systems, the second virtual memory address 261 may have a different bit value from that of the first virtual memory address 241. The extended user virtual address space 270 may indicate that an associated request is a request for a PIM operation, and a second extended virtual memory address 271 in the extended user virtual address space 270 may indicate that an associated memory request is a request for a PIM operation to be performed at the physical memory address 211 (here, "second" only indicates any address in user virtual memory address space). The second extended virtual memory address 271 may indicate that an associated request is a request for a PIM operation to be performed at the physical memory address 211 by including the same bit value as the second virtual memory address 261 and including additional bit values in unused bits (bits not utilized at the second virtual memory address 261). A request for a PIM operation expressed as/by a second extended virtual memory address 271 may be for executing an operation in the memory and may have a non-cacheable characteristic since the command is to be transferred to the memory (i.e., the command cannot be processed by cache memory, which lacks PIM capabilities). On the other hand, a request for a normal memory operation expressed as a second virtual memory address 261 has the potential to have either a cacheable characteristic or a non-cacheable characteristic, according to a request of a host program.

Any of a first virtual memory address 241, a first extended virtual memory address 251, a second virtual memory address 261, or a second extended virtual memory address 271 may be mapped to a same physical memory address 211 (an originally requested memory address), however, since these virtual memory addresses indicate different memory modes; a request for a normal operation may be distinguished (by its virtual address) from a request for a PIM operation, and may do so without necessarily adding an ISA or extending an existing ISA. In addition, for the same memory area, the host processor may allocate all or some of the memory with the non-cacheable characteristic for a request for a PIM operation or may allocate all or some of the memory with the cacheable or non-cacheable characteristic (either is possible) for a request for a normal operation.

The memory address mapping relationship shown in FIG. 2 may be utilized by the host processor 110 (e.g., by a kernel or a privileged module executing on the host processor 110), which uses the memory address mapping relationship to transmit a memory request and its associated memory address to the memory controller 120. The memory controller 120 may utilize the memory address mapping relationship to generate a command based on the memory request and based on its associated memory address received from the host processor (depending on its content, the memory address might indicate a PIM request).

Even when a physical memory address 221 and an extended physical memory address 231 (physical addresses) are mapped to the same physical memory address 211, the memory may be more effectively used by using a characteristic of having a different memory address according to a requested memory mode, and without a constraint of a non-cacheable access to PIM memory. A description thereof is made with reference to FIG. 3.

Figure 3:
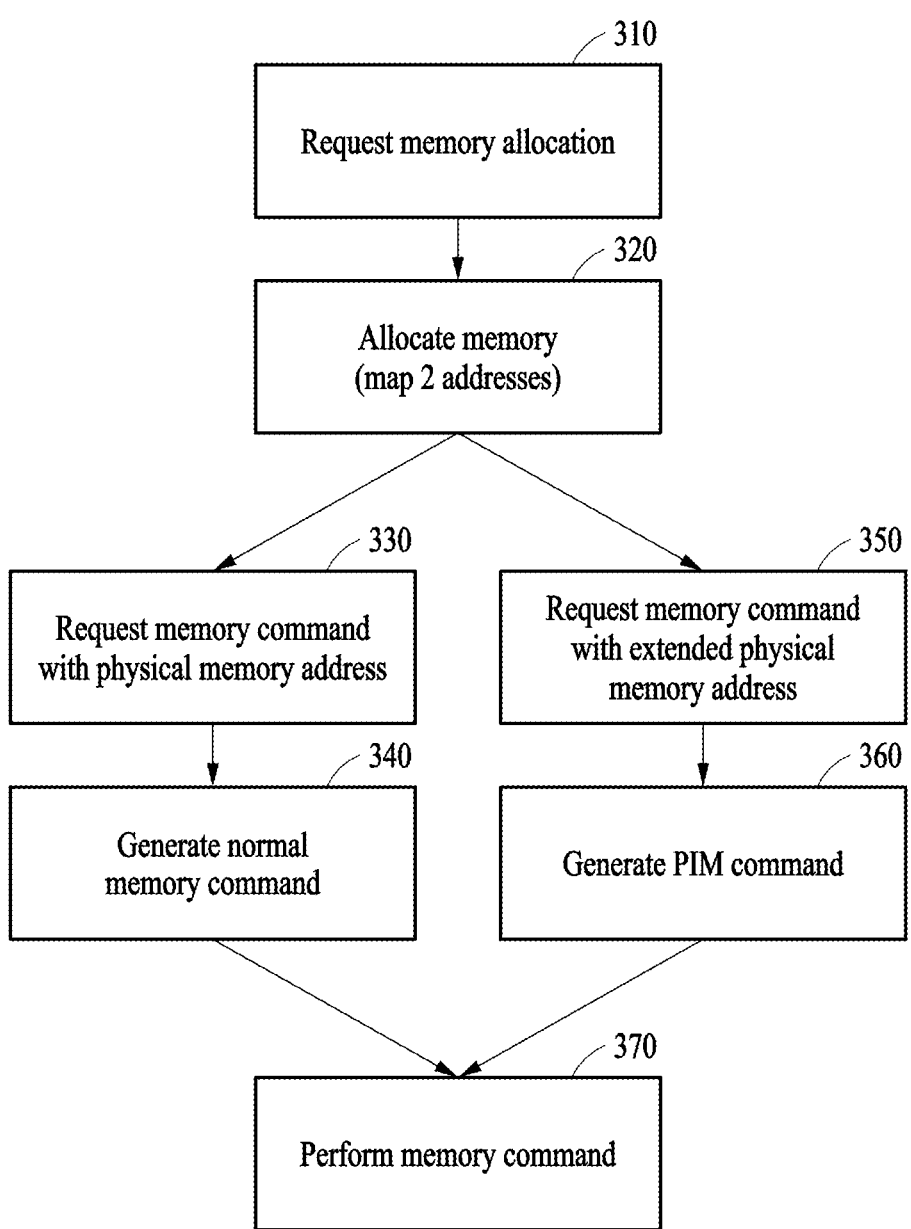
FIG. 3 illustrates an example of performing a command operation according to a memory request, based on a memory address, according to one or more embodiments.

FIG. 3 illustrates an example of an operation of performing a command in accordance with a memory request based on a memory address, according to one or more embodiments.

In the following examples, operations may be performed sequentially, but are not limited thereto. For example, the order of the operations may change and at least two of the operations may be performed in parallel. Operations 310 to 370 may be performed by one or more components of an electronic device, e.g., a host processor, a memory controller, a memory, and/or the like.

In operation 310, a host program may request memory allocation to a host processor.

In operation 320, the host processor may allocate a normal memory or a PIM memory based on two address mappings according to the memory allocation request. That is, either of two potential address mappings may be made, according to the request. In this case, either of two potential memory addresses may be mapped to the same memory area. According to an example, where a number of available PIMs is n, n+1 address mappings may be used (here, n may be a natural number).

In operation 330, when the request for memory allocation is a request for a normal (e.g., non-PIM) operation, the host processor may make a request to the memory controller for a memory command with a physical memory address. Further based on the request being a normal memory request, in operation 340, the memory controller may generate a normal memory command based on the memory allocation request from the host processor.

In operation 350, when the request for memory allocation is a request for a PIM operation, the host processor may make a request to the memory controller for a memory command with an extended physical memory address. Further based on the request being a PIM request, in operation 360, the memory controller may generate a PIM command.

In operation 370, the memory may perform the memory command received from the memory controller.

Operations similar to those of FIG. 3 may be used when the initial request is a request to read or access memory.

FIG. 4 illustrates an example of a physical memory address, according to one or more embodiments.

Referring to FIG. 4, a physical memory address 400 may be expressed as bits included in a normal physical address area 410 and an extended physical address area 420. FIG. 4 illustrates an example in which the physical memory address 400 is expressed in 64 bits, however, the description hereof may apply to examples in which the physical memory address 400 is expressed in various bits (e.g., 32 bits and the like).

The normal physical address area 410 may be an area or portion that is already used as a normal physical memory address and may include information (e.g., particular bits) about a bank and channel mapping. The physical memory address 221 in the physical address space 220 shown in FIG. 2 may be expressed through bits included in the physical address area 410. The extended physical address area 420 may include a meaningless predetermined value (e.g., '0'). In some embodiments, a predetermined value in the extended physical address area 420 may be used to differentiate a PIM request from a non-PIM memory request (i.e., a special value, e.g., all zeroes, in the extended physical address area 420 may indicate a non-PIM request). In the example shown in FIG. 4, the normal physical address area 410 may include bits 0 to 34.

The extended physical address area 420 may include unused bits (meaning bits that are not utilized for normal physical memory addresses) and may express an extended physical address. The normal physical address area 410 may include bits necessary to express a memory address of a data storage space, and the extended physical address area 420 may include bits other than the bits necessary to express the memory address of the data storage space. An extended physical memory address 231 in the extended physical address space 230 shown in FIG. 2 may be expressed by using unused bits in the extended physical address area 420 as well by using bits in the normal physical address area 410. The extended physical memory address 231 may indicate that an associated request is a request for PIM operation with respect to a memory area mapped to the physical memory address 221 by including, in the normal physical address area 410, valid bit values that are the same as those of the physical memory address 221 of FIG. 2 and that are not a predetermined value (e.g., 0) in the extended physical address area 420.

By using unused (with respect to normal addresses/ requests) bits in the extended physical address area 420 to distinguish requests for normal operations from requests for PIM operations, requests for normal memory operations may be effectively distinguished from requests for PIM operations even through the currently/normally used physical address 400.

FIG. 5 illustrates an example of a virtual memory address, according to one or more embodiments.

Referring to FIG. 5, in the case of kernel/privileged memory, a virtual address 500 may be expressed in bits included in a normal virtual address area 510 and an extended virtual address area 520. The bits of the virtual address 500 may indicate that either (i) that the virtual address 500 is a first virtual memory address 241 in the kernel virtual address space 240 shown in FIG. 2, or indicate (ii) that the virtual address 500 is a first extended virtual memory address 251 in the extended kernel virtual address space 250. Similarly, in the case of user/unprivileged memory, the bits of the virtual address 500 may indicate either (i) that the address is a second virtual memory address 261 in the user virtual address space 260, or may indicate that (ii) the virtual address 500 is a second extended virtual memory address 271 in the extended user virtual address space 270. To these ends, the bits of a virtual memory address 500 may be divided into a normal virtual address area 510 and an extended virtual address area 520 (for both kernel virtual addresses and user virtual addresses). Although the example shown in FIG. 5 is expressed in 64 bits, the description hereof likewise applies to other examples in which the virtual memory address 500 is expressed in various other quantities of bits (e.g., 32 bits and the like).

The normal virtual address area 510 may be an area that is already used for normal virtual memory addresses, e.g., is mapped to a page table address. The first virtual memory address 241 and the second virtual memory address 261 shown in FIG. 2 may be expressed through bits included in the normal virtual address area 510. The extended virtual address area 520 may include a meaningless predetermined value (e.g., '0'). In some embodiments, the predetermined value may serve as a flag to indicate that the virtual address is a normal virtual address. In the example shown in FIG. 5, the normal virtual address area 510 may include bits 0 to 46, but other bit amounts may be used.

The extended virtual address area 520 may include unused bits, meaning bits that are not used by normal virtual memory addresses. The normal virtual address area 510 may include bits necessary to express a memory address of a data storage space, and the extended virtual address area 520 may include bits other than the bits necessary to express the memory address of the data storage space. The first extended virtual memory address 251 and the second extended virtual memory address 271 shown in FIG. 2 may be expressed by using unused bits in the extended virtual address area 520 as well as by using the normal virtual address area 510. The first virtual memory address 251 may indicate that an associated request is a request for a PIM operation with respect to a memory area mapped to the physical memory address 221 by including, in the normal virtual address area 510, a valid bit value that is the same as that of the first virtual memory address 241 of FIG. 2 and that is not a predetermined value (e.g., 0) in the extended virtual address area 520.

By using unused bits in the extended virtual address area 520 to distinguish a request for a normal memory operation from a request for a PIM operation, the request for the normal memory operation may be effectively distinguished from the request for the PIM operation even through the currently used virtual address 500.

Figure 6:
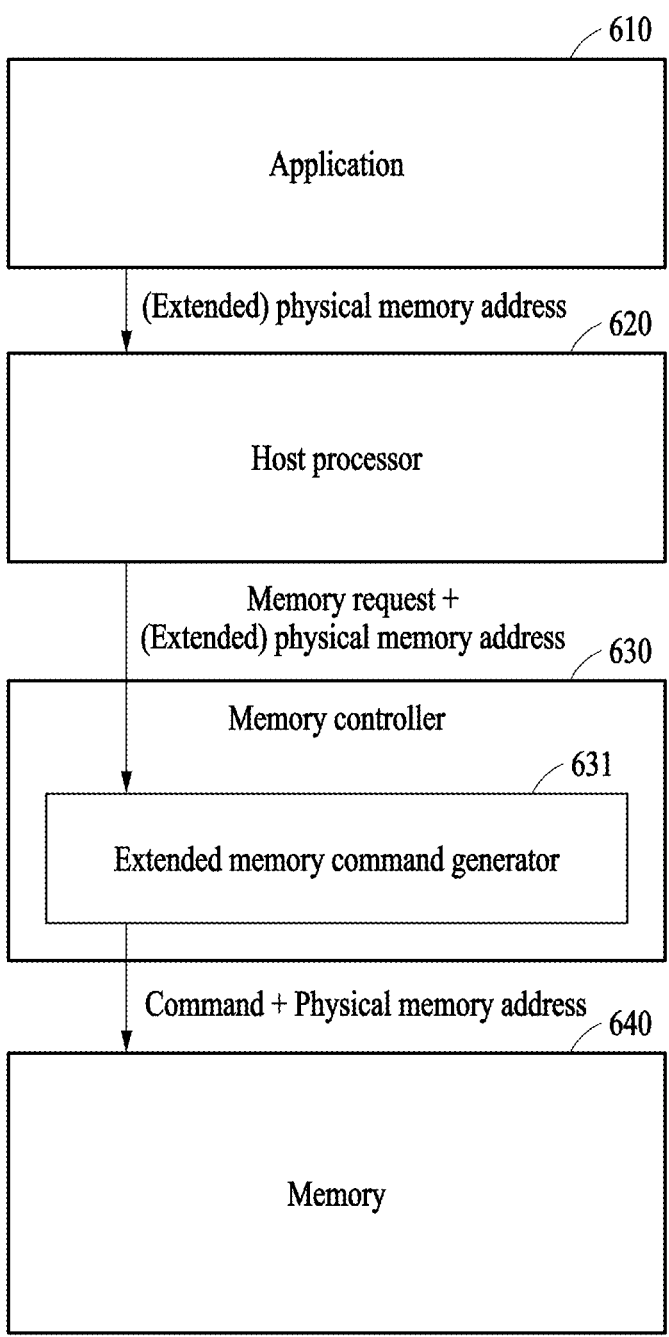
FIG. 6 illustrates an example of operating an electronic device, according to one or more embodiments.
Figure 7:
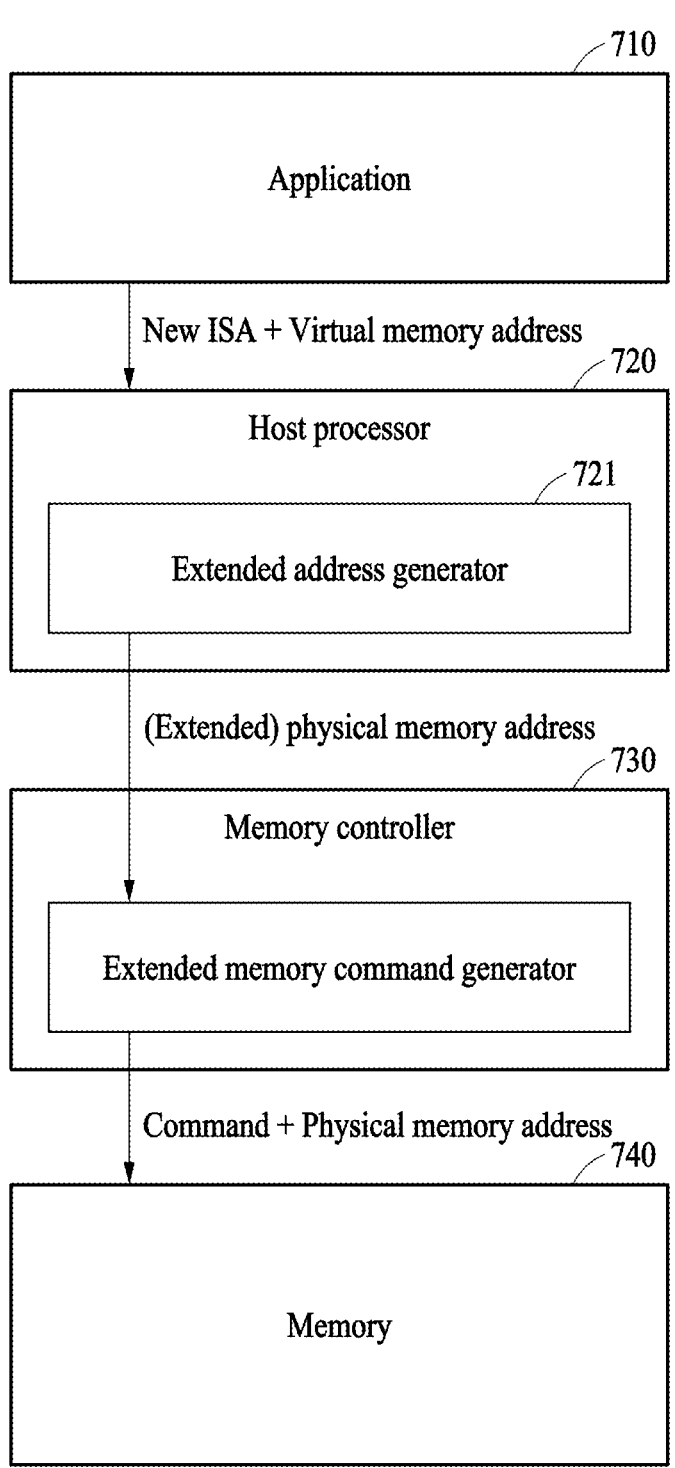
FIG. 7 illustrates an example of operating an electronic device, according to one or more embodiments.

FIGS. 6 and 7 illustrate examples of operating an electronic device, according to one or more embodiments.

Referring to FIG. 6, an example is shown in which a request is transferred from an application 610 to a host processor 620, without requiring a new ISA to be defined. When a request for a normal memory operation is to be distinguished from a request for a PIM operation, and without having to separately define an ISA in the host processor 620, a memory mode of a request may be identified through the physical memory address or the extended physical memory address, whichever the case may be. The application 610 may transmit a memory address (e.g., a physical memory address or an extended physical memory address) to the host processor 620, according to the memory mode needed by the application 610. The host processor 620 may transfer the memory request and the memory address received from the application 610 to a memory controller 630. The memory controller 630 may generate a command and a physical memory address according to the memory request, based on a memory address received from the host processor 620 and may transmit the generated command to a memory 640. For example, the command may be generated by an extended memory command generator 631. The memory 640 may execute the received command at the physical memory address.

Referring to FIG. 7, illustrated is an example in which a request is transferred from an application 710 to a host processor 720 based on a definition of an ISA with one or more instructions that specify a PIM request. As the ISA may obviate any need to distinguish whether a PIM operation is requested (by the application 710 to the host processor 720) through a physical memory address or an extended physical memory address. In the case of the request for the PIM operation, the application 710 may transmit a PIM-specific instruction (in the ISA) together with a physical virtual memory address to the host processor 720. Upon receipt of the PIM instruction, the host processor 720 may decode the PIM instruction and execute it by, at least in part, generating an extended physical memory address to indicate the PIM instruction/operation and may transmit the extended physical memory address to a memory controller 730 together with the memory request. For example, the extended physical memory address may be generated by an extended address generator 721. The descriptions of memories and memory controllers above are applicable to the memory controller 730 and a memory 740.

Even where a new or PIM-specific ISA is defined for providing PIM-identifying instructions (e.g., opcodes), the host processor 720 may transmit the extended physical memory address based on the ISA to the memory controller 730 together with the memory request. Accordingly, the above descriptions of distinguishing the request for the normal memory operation from the request for the PIM operation based on the physical memory address or the extended physical memory address may be applied even when PIM-specific ISA instructions are available.

Figure 8:
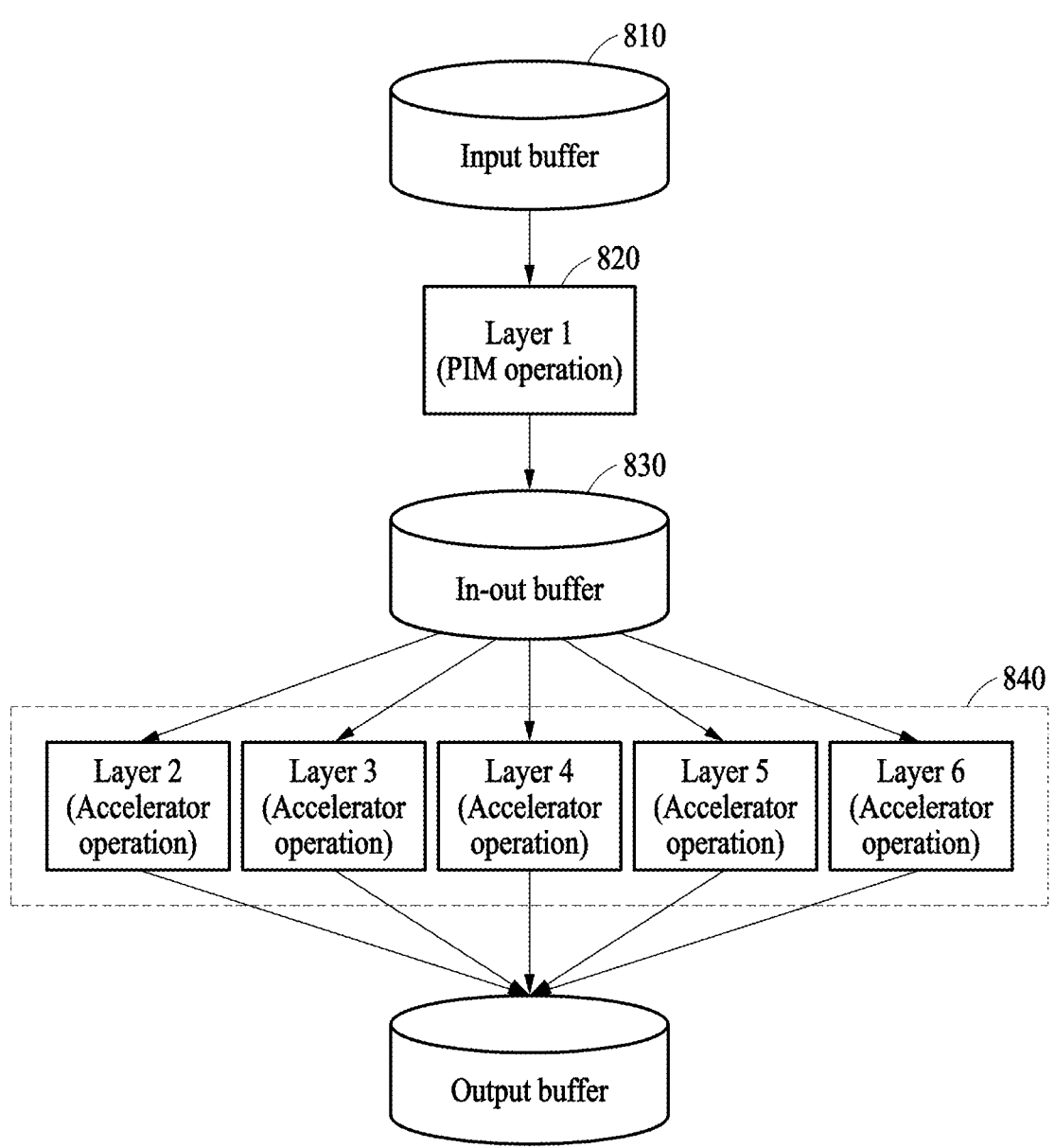
FIG. 8 illustrates an example of various accesses to the same memory area, according to one or more embodiments.

FIG. 8 illustrates an example of various accesses to the same memory area, according to one or more embodiments.

Referring to FIG. 8, an example is shown in which an operation of executing layers included in a neural network is performed. An electronic device may process an artificial intelligence (AI) operation of an AI application using an accelerator (e.g., a GPU or the like) and PIM memory. The AI application may constitute a neural network with layers of nodes, connections therebetween, and other typical neural network elements such as activation functions. In this case, in applying one or more of the techniques described above, some of the following conditions may help to optimize performance when executing the AI application.

1. An additional memory copy between a PIM operation and an accelerator operation may be avoided.
2. For an optimal PIM operation, the PIM operation may be performed in a non-cacheable memory.

3. For an optimal accelerator operation, the accelerator operation may be performed in a cacheable memory.

It may be assumed, as an example, that one layer (layer 1) 820 of the neural network may be more effectively processed by the PIM operation (by non-cached PIM memory) than by the accelerator operation (on the non-PIM hardware accelerator), while layers (layers 2 to 6) 840, using an operation result of the layer 820, may be more effectively processed by the accelerator operation than by the PIM operation. As described next with reference to this example, the cacheable/non-cacheable characteristic may be used to steer execution of any layer to the resources (PIM memory or hardware accelerator) with the best performance for that layer.

An in-out buffer 830 may correspond to an input buffer 810 of the layer 820 and may correspond to an output buffer of the layer 820. That is, the in-out buffer 830 may be (or include) a PIM memory that stores weights or inputs (e.g., a feature map) of the layer 820 (e.g., layer 1), and the in-out buffer 830 may directly store an output of layer 820. In other words, the in-out buffer 830 may be a memory in which the PIM operation is performed and in which a corresponding operation result is stored, and thus, the in-out buffer 830 may have a non-cacheable characteristic. The PIM operation may be, for example, a multiply-and-accumulate (MAC) operation performed by (and within) the in-out buffer 830 on data that remains stored in the memory of the in-out buffer 830, and a result of the PIM operation may be directly stored in the in-out buffer 830 as it accumulates without having to transfer the output of the layer 820 outside of the in-out buffer 830.

Continuing discussion of the example neural network, the layers 840 after layer 1 may have a reduced operation efficiency (with respect to the in-out buffer 830), for example due to unnecessary memory access overhead, where the layers 840 have a non-cacheable access to the in-out buffer 830 in which the operation result of the layer 820 is stored for processing of the accelerator operation. Even though the operation result of the layer 820 may have been stored in the in-out buffer 830 based on the non-cacheable characteristic (e.g., generated according to an instruction and/or memory address indicating non-cacheable), the accelerator may utilize the caching characteristic that is capable of both non-cacheable access and cacheable access to the same memory address and thus perform the cacheable access to the in-out buffer 830 (i.e., without having to go through a transfer to main memory first). That is, where a first operation result of the layer 820 (e.g., an intermediate feature map generated by the layer 820) is not found in a cache, the accelerator may nonetheless access the in-out buffer 830 to transfer the operation result to a cache and then directly call the operation result from the cache, without access to the in-out buffer 830. To the same area, the PIM may perform a non-cacheable access and the accelerator may perform a cacheable access, thereby effectively improving efficiency in operating an electronic device.

Figure 9:
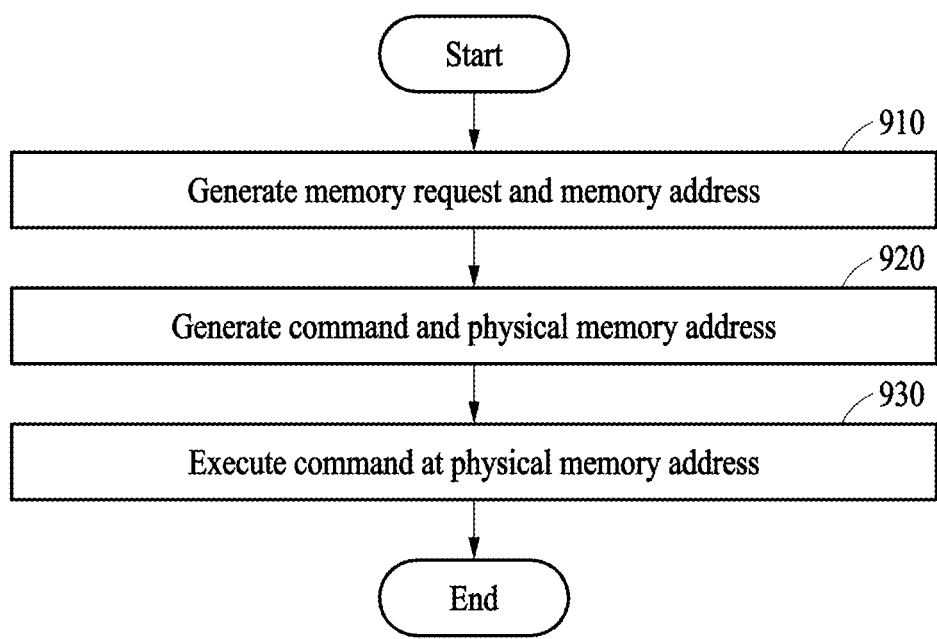
FIG. 9 illustrates an example of a method of operating an electronic device, according to one or more embodiments.

FIG. 9 illustrates an example of an operating method of an electronic device, according to one or more embodiments.

In the following examples, operations may be performed sequentially, but are not limited thereto. For example, the order of the operations may change and at least two of the operations may be performed in parallel. Operations 910 to 930 may be performed by at least one component (e.g., a host processor, a memory controller, a memory, and the like) of an electronic device. In operation 910, the electronic device may generate a memory request and a memory address, which is mapped (e.g., by memory virtualization) to a target memory mode that is one of available memory modes and to a physical memory address to which the memory request is applied. Each of the memory modes may indicate either normal memory or PIM memory.

The electronic device may generate a different memory address according to a memory mode of (or associated with) a command executed at a physical memory address by the memory request.

In addition, in response to the target memory mode indicating PIM, the electronic device may generate an extended physical memory address mapped to both the target memory mode and mapped to the physical memory address. The electronic device may express the extended physical memory address using unused (by non-PIM requests) bits included in a physical memory address with relation to the memory.

The memory address may be determined to be in either (i) the physical address space (corresponding to the memory) or (ii) one or more extended physical address spaces of the number of memory requests applicable to the memory mode indicating the PIM among memory modes. The physical address space may be mapped to a memory mode that operates as normal memory, and one or more extended physical address spaces may each be mapped to a memory mode that operates as PIM.

In addition, in response to a target memory mode indicating PIM, the electronic device may transmit the memory request and the memory address to the memory controller with a non-cacheable characteristic (i.e., the request is implemented without accessing a cache).

In addition, in response to a target memory mode indicating/being normal memory among a plurality of memory modes, the electronic device may determine the memory address to be the same as the physical memory address.

In addition, in response to a target memory mode indicating/being normal memory, the electronic device may check whether data is in a cache according to a request of an application. Where the data is not in the cache, the electronic device may transmit the memory request and the memory address to the memory controller.

In addition, in response to a target memory mode indicating normal memory and a PIM operation result stored at the physical memory address, the electronic device may check whether the PIM operation result is in the cache according to the request of the application and, where the PIM operation result is not in the cache, then the electronic device may send the memory request and the memory address to the memory controller.

In operation 920, the electronic device may generate a command and a physical memory address according to the target memory mode, based on the memory request and the memory address received from the host processor.

In operation 930, the electronic device may execute, at the physical memory address, the command received from the memory controller. The electronic device may perform either a normal memory operation or PIM operations at the physical memory address, according to the command.

Examples may extend the physical address space to effectively distinguish between PIM memory accesses and non-PIM memory accesses, even to the same memory area (or address space), and may request various PIM commands from a host system and support both of a cacheable memory access and a non-cacheable memory access, to the same memory area.

The computing apparatuses, the electronic devices, the processors, the memories, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:

a host processor configured to generate a memory request and a memory address, wherein the memory address is mapped to a target memory mode, wherein the target memory mode is any one of available memory modes, and wherein the memory address is also mapped to a physical memory address to which the memory request is to be applied;

a memory controller, outside of a memory device, configured to generate the physical memory address and a memory device command both generated according to the target memory mode mapped to the memory address, the generating of the memory controller based on the memory request and the memory address received from the host processor; and the memory device, which is separate from the memory controller, configured to receive the memory device command and the generated physical memory address from the memory controller and execute, at the received physical memory address, the received memory device command, wherein the host processor is further configured to generate the memory address as an extended physical memory address mapped to the target memory mode and to the physical memory address, in response to the target memory mode indicating a processing in memory (PIM) mode, and wherein the host processor is further configured to, based on the target memory mode indicating normal memory, check whether a processing in memory (PIM) operation result is in a cache according to a request of an application and, when the PIM operation result is not in the cache, transmit the memory request and the memory address to the memory controller, wherein the PIM operation result is stored at the physical memory address.

2. The electronic device of claim 1, wherein one of the memory modes is a normal memory mode and another of the memory modes is a processing in memory (PIM) mode.

3. The electronic device of claim 1, wherein the host processor is configured to generate a different memory address according to a memory mode of the memory device command executed by the memory device at the physical memory address.

4. The electronic device of claim 1, wherein the host processor is further configured to generate the memory address as an extended physical memory address mapped to the target memory mode and to the physical memory address, in response to the target memory mode indicating a processing in memory (PIM) mode.

5. The electronic device of claim 4, wherein the host processor is configured to express the extended physical memory address, using unused bits comprised in a physical address with respect to the memory device.

6. The electronic device of claim 1, wherein the memory address is determined based on a correspondence of the target memory mode to either a physical address space corresponding to the memory device or extended physical address spaces of a number of modes of memory requests applicable to a memory mode indicating processing in memory (PIM) mode among memory modes.

7. The electronic device of claim 6, wherein the physical address space is mapped to a memory mode that operates as normal memory mode, and the extended physical address space is mapped to a memory mode that operates as the PIM mode.

8. The electronic device of claim 1, wherein the host processor is configured to transmit the memory request and the memory address to the memory controller such that the memory request cannot be implemented with access to a cache, in response to the target memory mode indicating processing in memory (PIM) mode.

9. The electronic device of claim 1, wherein the host processor is configured to determine the memory address to be the same as the physical memory address, in response to the target memory mode indicating a normal memory mode among the memory modes.

10. The electronic device of claim 1, wherein the host processor is configured to check whether data is in a cache according to a request of an application and, when the data is not in the cache, transmit the memory request and the memory address to the memory controller, in response to the target memory mode indicating a normal memory mode.

11. The electronic device of claim 1, wherein the memory device is configured to perform either a normal memory operation or a processing in memory (PIM) operation at the physical memory address, according to the memory device command.

12. A method of operating an electronic device, the method comprising:

generating, by a host processor comprised in the electronic device, a memory request and a corresponding memory address mapped to a target memory mode, the target memory mode among memory modes comprised in the electronic device, and wherein the memory address is also mapped to a physical memory address to which the memory request is to be applied;

generating, by a memory controller comprised in the electronic device and outside of a memory device, the physical memory address and a memory device command both generated according to the target memory mode, the generating of the memory controller based on the memory request received from the host processor and the memory address; and receiving by the memory device, which is comprised in the electronic device and which is separate from the memory controller, from the memory controller, the memory device command and the physical memory address, and executing, by the memory device, the received memory device command at the received physical memory address, wherein the host processor is further configured to generate the memory address as an extended physical memory address mapped to the target memory mode and to the physical memory address, in response to the target memory mode indicating a processing in memory (PIM) mode, and wherein the host processor is configured to, based on the target memory mode indicating normal memory, check whether a processing in memory (PIM) operation result is in a cache according to a request of an application and, when the PIM operation result is not in the cache, transmit the memory request and the memory address to the memory controller, wherein the PIM operation result is stored at the physical memory address.

13. The method of claim 12, wherein the memory modes include a normal memory mode and a processing in memory (PIM) mode.

14. The method of claim 12, wherein the generating of the memory request and the memory address comprises generating a different memory address according to a memory mode of the memory device command executed by the memory device at the physical memory address.

15. The method of claim 12, wherein the generating of the memory request and the memory address comprises generating the memory address as an extended physical memory address using bits reserved for extended physical memory addresses in response to the target memory mode indicating a processing in memory (PIM) mode.

16. A method comprising:

receiving, by a host processor executing an operating system kernel, a first memory request from an application executed by the kernel, and based on the host processor determining that the first memory request is a normal memory request, passing the first memory request and a corresponding unextended memory address to a memory controller;

receiving, by the memory controller, the first memory request and the corresponding unextended memory address, and based thereon, by the memory controller, generating first memory device commands that implement the first memory request and generating an unextended physical memory address corresponding to the unextended memory address;

receiving and executing, by the memory device, the first memory device commands according to the unextended physical memory address; receiving, by the host processor, a second memory request from the application, and based on the host processor determining that the second memory request corresponds to a processing-in-memory (PIM) operation, generating an extended memory address and passing the second memory request and the corresponding extended memory address to the memory controller;

receiving, by the memory controller, the second memory request and the corresponding extended memory address, and based thereon, by the memory controller, generating second memory device commands that implement the second memory request and generating an extended physical memory address corresponding to the extended memory address; and receiving and executing, by the memory device, the second memory device commands according to the extended physical memory address.

17. The method of claim 16, wherein the first memory device commands implement the normal memory operation, and wherein the second memory device commands implement the PIM operation.

18. The method of claim 16, wherein one or more bits of the extended memory address are reserved to flag the second memory request as corresponding to the PIM operation.

19. The method of claim 16, wherein, based on the determining, by the host processor, that the second memory request corresponds to the PIM operation, bypassing a cache in passing the second memory request to the memory controller.

* * * * *